(12) United States Patent
Araujo et al.

(10) Patent No.: US 9,396,086 B2
(45) Date of Patent: Jul. 19, 2016

(54) METHOD FOR CLIENT WORKLOAD CHARACTERIZATION IN A ZSERIES BENCHMARK CENTER ENVIRONMENT

(75) Inventors: Aaron Ortiz Araujo, Las Vegas, NV (US); Karl J. Duvalsaint, Lagrangeville, NY (US); Terence A. Ford, Rochester, MN (US); Gary M. King, Millbrook, NY (US); Clarisse A. Taaffe-Hedglin, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2571 days.

(21) Appl. No.: 11/548,307

(22) Filed: Oct. 11, 2006

(65) Prior Publication Data

US 2008/0091484 A1    Apr. 17, 2008

(51) Int. Cl.
*G06Q 10/00* (2012.01)
*G06F 11/34* (2006.01)
*G06Q 10/06* (2012.01)
*G06F 15/173* (2006.01)

(52) U.S. Cl.
CPC ........ *G06F 11/3428* (2013.01); *G06Q 10/0633* (2013.01); *G06Q 10/06393* (2013.01)

(58) Field of Classification Search
USPC ........................................... 705/11
See application file for complete search history.

(56) References Cited

U.S. PATENT DOCUMENTS

| | | | | |
|---|---|---|---|---|
| 7,475,189 B2 * | 1/2009 | Gabryjelski | ........ | G06F 11/1092 707/999.202 |
| 2001/0027467 A1 * | 10/2001 | Anderson | ......... | G06F 17/30575 709/201 |
| 2004/0002839 A1 * | 1/2004 | Ulrich | .................... | G05B 17/02 703/2 |
| 2004/0194090 A1 * | 9/2004 | Kelly et al. | .................. | 718/100 |
| 2005/0004879 A1 | 1/2005 | Mathias et al. | | |
| 2006/0155608 A1 * | 7/2006 | Bantz | .................. | G06Q 30/016 705/26.43 |
| 2007/0011330 A1 * | 1/2007 | Dinker | ................ | G06F 11/3409 709/226 |
| 2009/0055594 A1 * | 2/2009 | Berg | .................. | G06F 11/3447 711/136 |

* cited by examiner

*Primary Examiner* — Garcia Ade
(74) *Attorney, Agent, or Firm* — Cantor Colburn LLP; William A. Kinnaman, Jr.

(57) ABSTRACT

A method for client workload characterization in a zSeries benchmark center environment. The method includes collecting client characterization data (CCCD). The method concludes with calibrating a large system performance reference (LSPR) relative to the client characterization data.

8 Claims, 2 Drawing Sheets

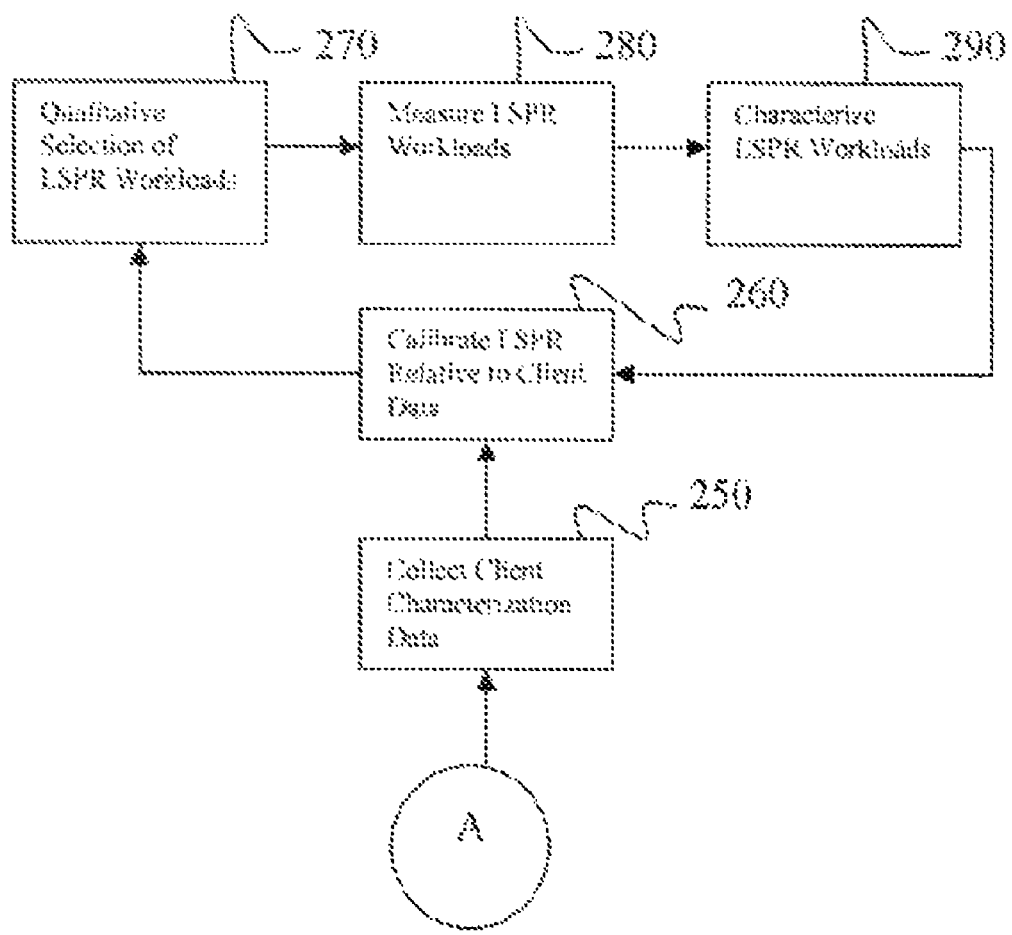

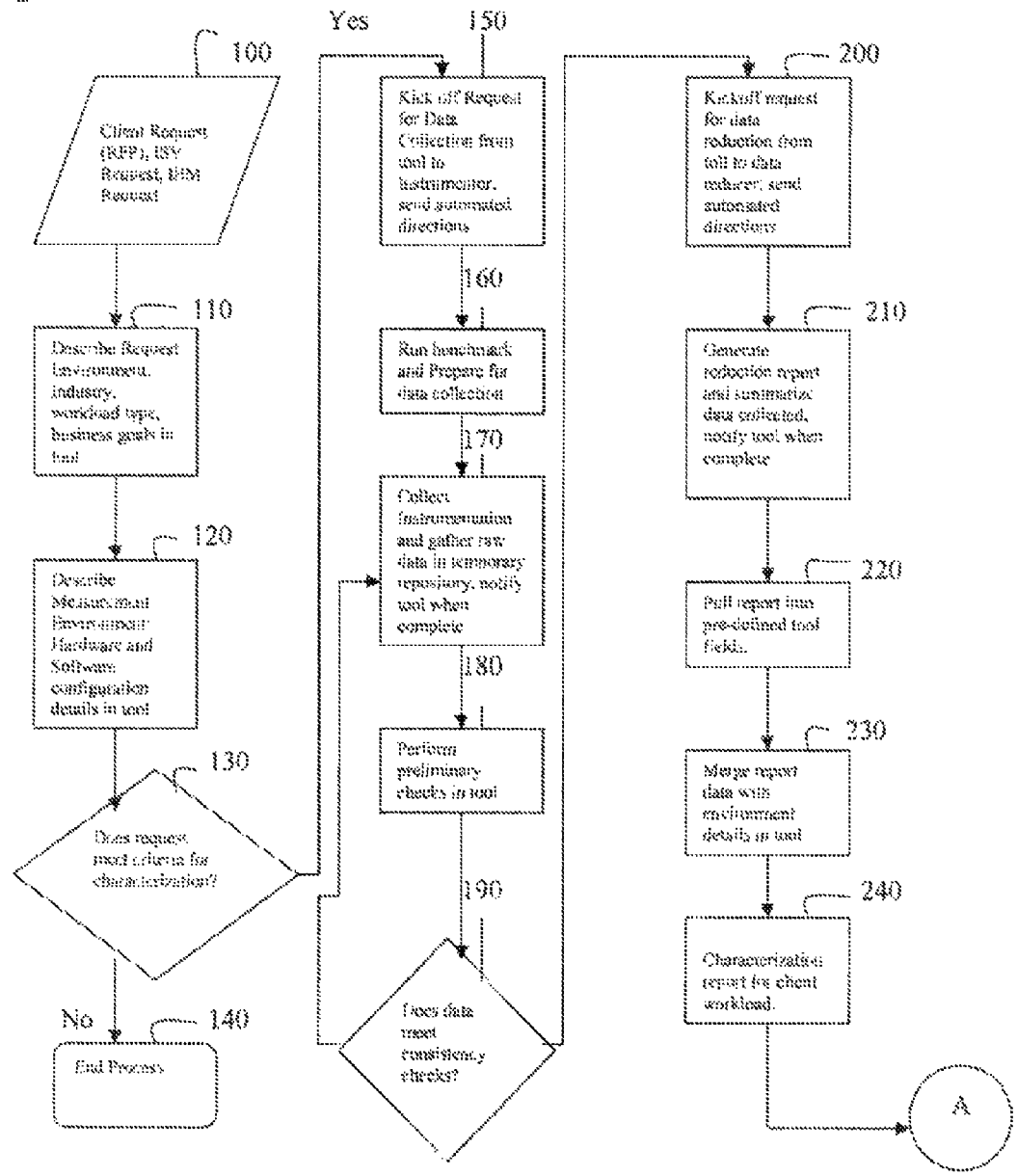

METHOD FOR CLIENT WORKLOAD CHARACTERIZATION IN A ZSERIES BENCHMARK CENTER ENVIRONMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to computer and processor architecture, and more particularly, to a method for client workload characterization.

2. Description of Background

A processor's performance can be defined in terms of transactions per unit time, the number of end-users running concurrently. Metrics such as Internal Transaction Rates (ITR), External Transaction Rates (ETR) and Path Length are key indicators of the characteristics of a customer's workload. A processor's absolute capacity can be determined for any specific workload.

The current process to size a zSeries processor's performance uses the IBM Large System Performance Reference (LSPR) methodology: five well-defined workloads are sized to obtain ITR ratio tables of relative performance.

The LSPR ratios represent IBM's assessment of relative processor capacity in an unconstrained environment for specific benchmark workloads and system control programs specified in the tables. Ratios are based on measurements and analysis. The amount of analysis as compared to measurement varies with each processor.

Each individual LSPR workload is designed to focus on a major type of activity, such as interactive, on-line database, or batch. The LSPR does not focus on individual pieces of work such as a specific job or application. Instead, each LSPR workload includes a broad mix of activity related to that workload type.

A wide variety of workload environments exist throughout the world, using any number of different software products. It is highly unlikely that an individual LSPR workload will represent the totality of a particular production workload. Rather, the LSPR workloads are intended to define the envelope (or range) of the expected capacity difference between two processors. As part of a capacity planning exercise for a particular production workload, the intent should be to estimate where in the envelope the production workload will fall by considering a mixture of the LSPR workloads that best represent the production environment.

Thus, there is a need to provide a fact driven, automated validation mechanism into the LSPR process.

SUMMARY OF THE INVENTION

The shortcomings of the prior art are overcome, and additional advantages are provided through the provision of a method for client workload characterization in a zSeries benchmark center environment. The method includes collecting client characterization data (CCCD). The method concludes with calibrating a large system performance reference (LSPR) relative to the client characterization data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a method for client workload characterization in a zSeries benchmark center environment.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

FIG. 1 illustrates one example of a method for client workload characterization in a zSeries benchmark center environment; and FIG. 2 illustrates one example of a method for collecting client characterization data for the method shown in FIG. 1.

The detailed description explains an exemplary embodiment of the invention, together with advantages and features, by way of example with reference to the drawings.

DETAILED DESCRIPTION OF THE INVENTION

Referring to FIGS. 1 and 2, a method for client workload characterization in a zSeries benchmark center environment, is shown. In the zSeries benchmark center, performance data about absolute capacity information is particularly useful because the information represents the production workload for most internal or external customers or Independent Software Vendors (ISV) applications. Such capacity information has not been available to performance engineers and brand organizations in the past. The method for client workload characterization in a zSeries benchmark center creates a process whereby raw instrumented data will be collected for selected client benchmarks, a central data repository will be used, an interface to a service machine running reduction programs on the collected instrumented data will be established, instrumented reports will be generated, a correlation between the instrumented reports, physical machine characteristics, industry and business attributes will be made. The correlation made with the type of applications running on the machine at that time and the instrumented reports will be used as inputs to various brands and performance engineering processes. This process also automates the processing of the instrumented data, generates reports that contain statistics associated with counter data for all the processors in the configuration.

Starting at step 250 wherein client characterization data (CCCD) is collected. The initial requirement to collect client characterization data is utilized to identify a client benchmark request. The benchmark request can take the form of three distinct types of requests. The first type of request is a client benchmark request to prove the client's workload performance or scaling capability as part of an RFP process. The second type of request comes as a request to provide a performance proof point on a particular Independent Software Vendor (ISV) product. The third type of request is generated internally from other parts of the business that have a need to evaluate internal technology options. In all cases, the request includes contact information, test sponsor, business opportunity and test configuration.

In order for client characterization data to be collected, a sub-routine method must be performed prior to the client characterization data being collected. The sub-routing starts at step 100 and upon completion of the sub-routine at step 240, the output ("A") of the sub-routine is utilized as the input for step 250. At step 100 of the sub-routine, a client benchmark request is identified. The benchmark center staff uses an online collection tool to assist in gathering, collecting and recording information about projects running in the center. The tool is highly customizable. For every request, the tool tracks a number of key fields that describe the request. A number of fields are collected to describe the request including required key information. The following are relevant to the workload characterization process described here: benchmark ID, benchmark timeframe, industry, benchmark purpose (for example, performance, scalability and proof of concept) and workload type.

At step 110, the request environment is described: such things as industry, workload type and business goals in the tool are described.

At step 120, the measurement environment is described. To describe the measurement environment, the following software fields are tracked: operating system, middleware, third party software vendors, application software used. The information gathered includes specific versions and levels. Similarly, the following fields are tracked to describe the hardware for the workload runs include server product name, system size, processor clock speed, memory, cache sizes, firmware level for every system in the configuration. The disk subsystem configuration is also captured: controllers, capacity, disk types, data protection level, firmware, physical layout. The network is also described: switches interconnect types and speeds.

At step 130, a set of criteria is established to determine if the request qualifies for characterization. The criteria are based on three areas. The criteria being based upon: (i) Is the request environment and measurement environment of interest? (ii) Are the resources and timeframe available for the characterization? (iii) Are the approvals in place to collect client workload data in the benchmark center? If the request does not meet the criteria for characterization, the process terminates at step 140.

At step 150, a request for data collection to an instrumenter is kicked off provided the requests meets the criteria for characterization. The instrumenter is the person responsible for collecting the instrumentation data, generally a system administrator. Once the criteria is met, a flag is set in the collection tool which generate an e-mail to the instrumenter, which contains a request to collect instrumentation data for the client request along with instructions of how to collect the data.

At step 160 a benchmark is run and preparation for data collection takes place. The benchmark center team sets up, runs and tunes the workload without instrumentation. Once the workload is ready for instrumentation, the instrumentor has procedures to follow to prepare the system for data collection.

At step 170, raw instrumentation is collected and gathered in a repository. The z/OS executables for the Instrumentation Application for Trex (TIA) and DANU (GIA) systems are supplied to the instrumenter. These executables are used to drive the start, stop, reset and dump functions. Step library ("LIB") is set up to run with the respective LIB in the job control language ("JCL") utilized to drive the respective job. Sample command scripts are provided to the instrumenter that can be modified and utilized to drive the instrumentation functions. An instrumentation run begins when a start instrumentation function is submitted via a special job that invokes the TIA/GIA applications. The start instrumentation JCL will contain user specified parameters that are specific to the nature of the configuration and workload to be instrumented. An instrumentation run ends when a stop instrumentation function is submitted via a special job that invokes the TIA/GIA applications at the end of the benchmark run. All of the data associated with an instrumentation run is collected and written to user specified files in the temporary data repository when requesting the dump instrumentation data function via a special job that invokes the TIA/GIA applications.

At step 180, preliminary checks are performed in the resulting files in the repository. The resulting files from the dump job described above shall be collected. Once the files are collected successfully a note is sent to the collection tool with the names and attributes of the files.

At step 190, a determination is made whether the data in the files meets consistency checks. The preliminary consistency checks validate that the run was successful and the correct files were collected with the proper attributes. A field is then set in the collection tool to indicate that the dump job files are available for data reduction.

At step 200, a request for data reduction is kicked off. The collection tool notifies the data reducer, typically an instrumentation expert, that the files are ready to be reduced with instruction of which report are to be generated. The to dump job files are transferred to a pre-defined user id. The files are generally transmitted as binary files.

At step 210, reduction reports are generated. Once the data is received, the data reducer will process the data to generate the reports associated with the processing of instrumentation data. Once the reports are available, an update will be sent to the collection tool via a mutually defined method.

At step 220, the reports are pulled into pre-defined tool fields. The reduction reports are pulled into the collection tool and key fields are populated into a characterization summary report for the workload.

At step 230, the report is merged with environment details in the tool. The characterization summary is linked to the request environment and measurement environment. This creates a view of the workload characterization in its execution environment. Then at step 240, the characterization report for the client workload is completely generated.

At step 260, a large system performance reference (LSPR) relative to the client characterization data is characterized. The outputs from collecting client characterization are used to validate LSPR using client data. The characterization report is a complete characterization report that compares the measured workload to other workloads based on defined selection criteria. The other workload characterizations come from other client benchmarks or workloads whose characteristics have been identified with the same fields. The selection criteria can be workload type, industry, HW used or any of the fields collected. The disclosure introduces a feedback loop into the LSPR process. The feedback loop is constructed between steps 260, 270, 280 and 290. The feedback loop permits client data to be collected in an automated way from the benchmark center, which is compared to the LSPR data. For example, this new validation technique (feedback loop) allows correlation between new software counters in System Management Facilities ("SMF") records and instrumentation data collected on client workloads from the zSeries benchmark center. The results from client workloads will be prepared to LSPR workloads. This will improve the quality of the "as is" LSPR data. The feedback loop into the LSPR provides quantitative insight into how client performance may fit into LSPR performance ranges.

At step 270, the LSPR workloads are selected qualitatively. Then at step 280, the LSPR workloads are measured. In conclusion, at step 290 the LSPR workloads are characterized.

The method for client workload characterization in a zSeries benchmark center environment describes client workloads in terms of a complete system view of consumed resources down to the hardware layer and other workload attributes. These attributes can be compared and contrasted to the attributes of the known LSPR workloads. The purpose of the feedback loop in the method for client workload characterization in a zSeries benchmark center environment is to determine how similar the LSPR workloads are to client workloads. The characterization data provided to performance analysis can guide them in the future selection of LSPR workloads and to further calibrate and optimize the design points.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for client workload characterization, comprising:
    performing a plurality of transactions on a processor in a zSeries benchmark center environment, the performing the plurality of transactions generating client characterization data;
    collecting client characterization data (CCCD) in a central data repository, the CCCD characterizing performance of the processor;
    calibrating a large system performance reference (LSPR) relative to the client characterization data;
    selecting LSPR workloads qualitatively;
    measuring LSPR workloads; and
    characterizing the LSPR workloads;
    wherein the calibrating, selecting, measuring and characterizing are arranged in a feedback loop to collect client data in an automated way from the benchmark center, the client data compared to LSPR data to provide correlation between software counters in System Management Facilities records and instrumentation data collected on client workloads from the zSeries benchmark center;
    wherein the CCCD includes identifying a client benchmark request;
    wherein the identified benchmark request is in one of the following forms, (i) a client benchmark request to prove at least one of, (a) the client's workload performance and, (b) the client's scaling capability, (ii) a request to provide a performance proof point on an independent software vendor (ISV) product and, (iii) a request to evaluate internal technology options;
    wherein the CCCD further includes describing the request environment;
    wherein the CCCD further includes describing the measurement environment, the measurement environment including (i) software fields including operating system, middleware, third party software vendors, application software, and levels, (ii) hardware fields including server product name, system size, processor clock speed, memory, cache sizes, firmware level for every system in the configuration, controllers, capacity, disk types, data protection level, firmware, physical layout and (iii) network fields including switches, interconnect types and speeds;
    wherein the CCCD further includes determining whether the request meets the criteria for characterization, the criteria being based upon, (i) whether the request environment and measurement environment of interest, (ii) whether the resources and timeframe available for the characterization, and (iii) whether the approvals in place to collect client workload data in the benchmark center;
    wherein the CCCD further includes initiating a request for data collection to an instrumenter provided the requests meets criteria for characterization, the initiating the request for data collection to the instrumenter being via an e-mail to the instrumenter, which contains the request to collect instrumentation data for the client along with instructions of how to collect the data;
    wherein the CCCD further includes collecting raw instrumentation data in the central data repository by supplying executables to the instrumenter, the executables used to drive start, stop, reset and dump functions, wherein an instrumentation run begins when a start instrumentation function is submitted via a special job that invokes a TIA/GIA application, the start instrumentation job control language including user specified parameters that are specific to the nature of the configuration and workload to be instrumented;
    wherein the CCCD further includes initiating a request for data reduction which includes notifying a data reducer running on a service machine that files are ready to be reduced with instruction of which report is to be generated and transferring dump job files to a pre-defined user id.

2. The method of claim 1, wherein the CCCD further includes running a benchmark and preparing for data collection.

3. The method of claim 2, wherein the CCCD further includes performing preliminary checks on the resulting files in the repository.

4. The method of claim 3, wherein the CCCD further includes determining whether the data in the files meets consistency checks.

5. The method of claim 4, wherein the CCCD further includes generating reduction reports.

6. The method of claim 5, wherein the CCCD further includes pulling the reduction reports into the collection tool.

7. The method of claim 6, wherein the CCCD further includes merging the reduction reports having environment details.

8. The method of claim 7, wherein the CCCD further includes generating a characterization report for the client workload.

* * * * *